(12) United States Patent
Morimoto et al.

(10) Patent No.: US 7,661,270 B2
(45) Date of Patent: Feb. 16, 2010

(54) CONTROL APPARATUS FOR GAS TURBINE

(75) Inventors: Hitoshi Morimoto, Takasago (JP); Koichi Akagi, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 670 days.

(21) Appl. No.: 11/600,154

(22) Filed: Nov. 16, 2006

(65) Prior Publication Data
US 2007/0107438 A1    May 17, 2007

(30) Foreign Application Priority Data
Nov. 17, 2005    (JP)    .............................. 2005-332920

(51) Int. Cl.
*F02C 6/04*    (2006.01)
(52) U.S. Cl. .......................... 60/785; 60/795; 60/39.08
(58) Field of Classification Search .................. 60/782, 60/785, 795, 806, 39.08
See application file for complete search history.

(56) References Cited

U.S. PATENT DOCUMENTS

| 4,156,342 A | * | 5/1979 | Korta et al. | ................ 60/39.08 |
|---|---|---|---|---|
| 5,134,844 A | * | 8/1992 | Lee et al. | ....................... 60/806 |
| 6,513,335 B2 | * | 2/2003 | Fukutani | ....................... 60/785 |
| 6,622,490 B2 | * | 9/2003 | Ingistov | ....................... 60/782 |
| 6,966,191 B2 | * | 11/2005 | Fukutani et al. | ................ 60/785 |
| 7,562,519 B1 | * | 7/2009 | Harris et al. | ................ 60/39.08 |
| 7,584,619 B2 | * | 9/2009 | Granitz et al. | ................ 60/785 |
| 2001/0047651 A1 | * | 12/2001 | Fukutani | .................... 60/39.07 |

FOREIGN PATENT DOCUMENTS

| JP | 9-60532 | 3/1997 |
|---|---|---|
| JP | 2005-23812 | 1/2005 |

* cited by examiner

*Primary Examiner*—William H Rodriguez
(74) *Attorney, Agent, or Firm*—Wenderoth, Lind & Ponack, L.L.P.

(57) ABSTRACT

An exhaust-side bearing rotatably supports a rotor of a turbine. A seal air-pipe and a first air-supply pipe supply compressed air extracted from a compressor of the turbine to the exhaust-side bearing. A second air-supply pipe supplies compressed air from a supplementary air-source to the exhaust-side bearing. A control apparatus switches between the first air-supply pipe and the second air-supply pipe based on the operation state of the gas turbine.

6 Claims, 3 Drawing Sheets

CONTROL APPARATUS FOR GAS TURBINE

BACKGROUND OF THE INVENTION

1. Field of the Invention

The present invention generally relates to a control apparatus, and specifically relates to a control apparatus for controlling a gas turbine.

2. Description of the Related Art

A typical gas turbine includes a compressor, a combustor, and a turbine. Air is taken into the gas turbine through an air inlet and the air is compressed by the compressor to produce compressed air that is at high temperature and high pressure. In the combustor, the compressed air is mixed with fuel, and the mixture is burned to produce combustion gas that is at high temperature and high pressure. The combustion gas is used to drive the turbine that in turn drives a generator.

A typical turbine has a turbine casing and a plurality of stator vanes and rotor vanes arranged alternately in the turbine casing on a turbine shaft. The turbine shaft is connected to the generator, so that the generator is driven when the turbine shaft rotates. The turbine shaft is driven and rotated by rotating the rotor vanes by the force of the combustion gas. The combustion gas, after driving the turbine, is converted to gas that is at a static pressure by a diffuser provided in an exhaust casing. The combustion gas at the static pressure is released into the atmosphere.

The turbine shaft is rotatably supported by bearings. Lubricating oil is supplied to the bearings so that the turbine shaft rotates smoothly in the bearings. Moreover, multi-step seal rings are provided near the bearings so that the lubricating oil does not flow out of the bearings. In addition, seal air, which is extracted from the compressor, is supplied to the seal rings so that the lubricating oil does not leak out of the bearings, and high-temperature gas cannot seep into the bearings.

Japanese Patent Application Laid-open No. 2005-023812 discloses a conventional gas turbine.

In the conventional gas turbine, however, the compressor stops when the operation of the gas turbine is stopped. If the compressor stops, the air taken into the compressor is not compressed, so that there is no compressed air that can be used as the seal air. If there is no seal air, the ambient high-temperature gas can enter inside the bearings, or the lubricating oil can leak from the bearings to the outside. If the ambient high-temperature gas enters inside the bearings, the lubricating oil in the bearings is heated and can get carbonized and solidified. The carbonized lubricating oil can adhere to the sealing surface of the seal rings, which causes vibrations of the turbine shaft.

Thus, there is a need of a technology that inhibits heating of the lubricating oil supplied to the bearings.

SUMMARY OF THE INVENTION

It is an object of the present invention to at least partially solve the problems in the conventional technology.

According to an aspect of the present invention, a control apparatus for a gas turbine, the gas turbine including a compressor that compresses air to produce compressed air, a combustor that produces combustion gas from the compressed air, a turbine shaft that rotates due to the force of the combustion gas, and a bearing that rotatably supports a turbine shaft, includes a first passage configured to extract a portion of the compressed air from the compressor and supply extracted compressed air to the bearing; a second passage configured to supply compressed air from an external supplementary air-source to the bearing; and a passage switching unit that switches between the first passage and the second passage based on an operation state of the gas turbine.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail, with reference to the accompanying drawings. The present invention is not limited to these exemplary embodiments.

Figure 1:
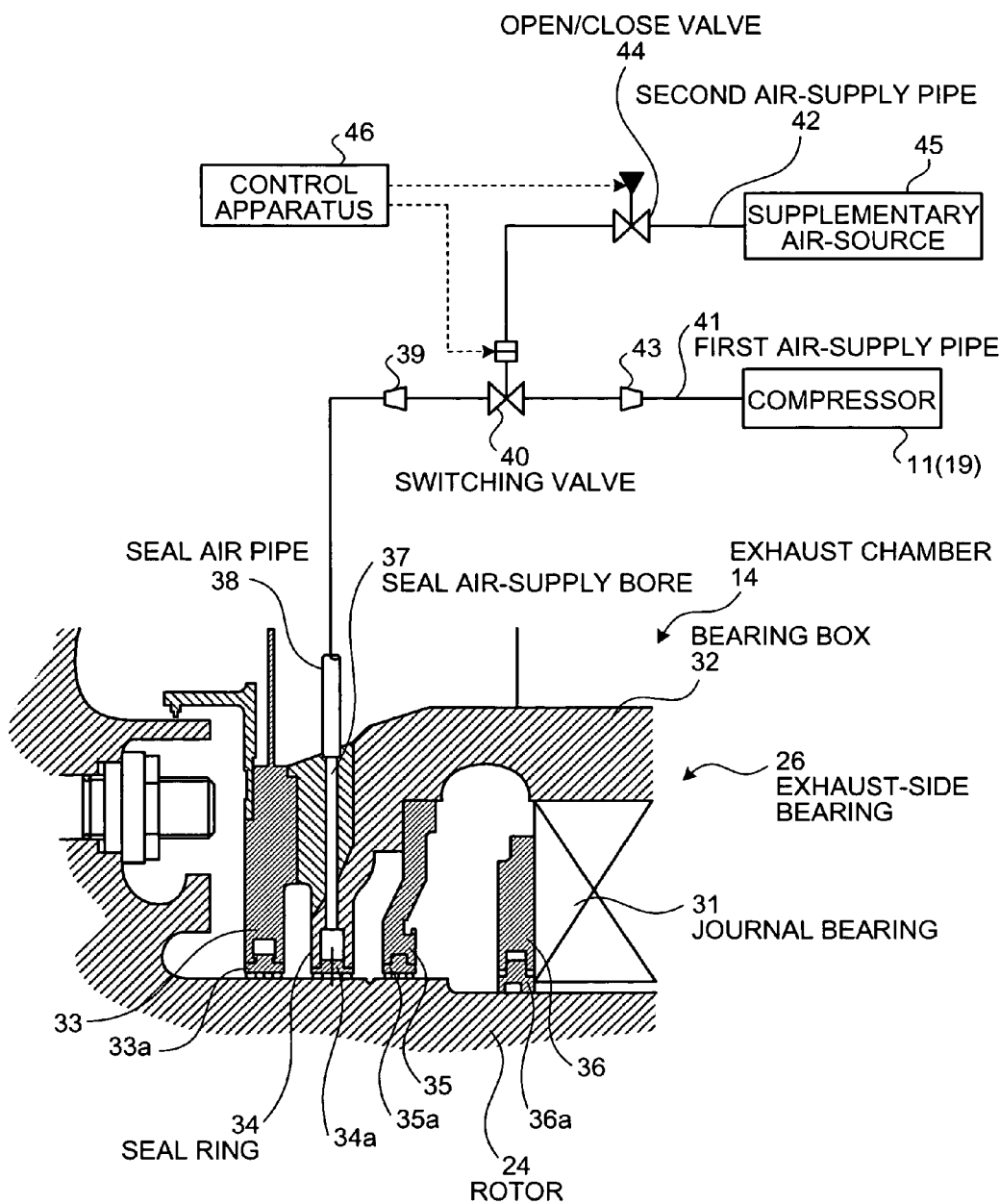
FIG. 1 is a schematic of a control apparatus for a gas turbine according to an embodiment of the present invention.
Figure 2:
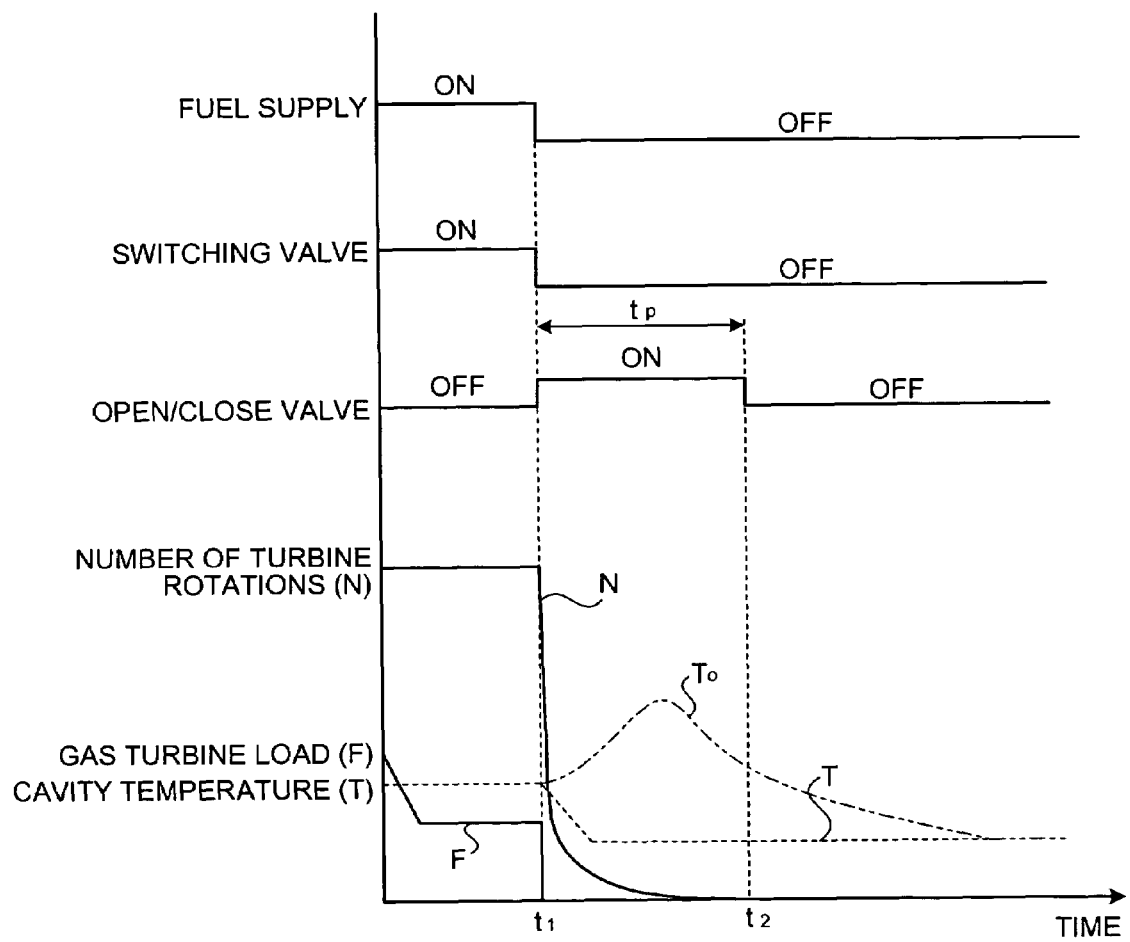
FIG. 2 is a graph for explaining changes in the operation control and the operation state when the gas turbine is stopped.
Figure 3:
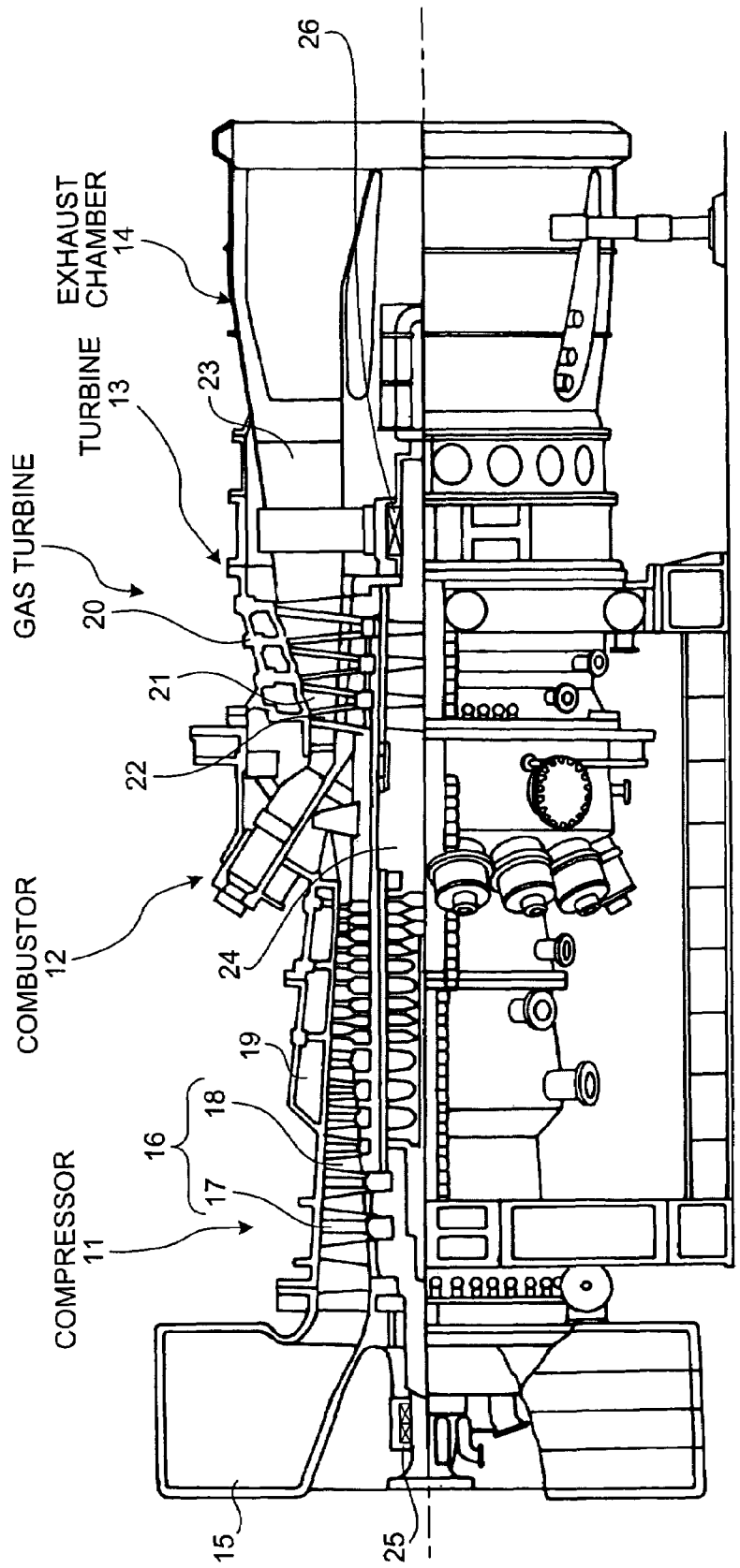
FIG. 3 is a schematic of the gas turbine according to the embodiment.

FIG. 1 is a schematic of a control apparatus for a gas turbine according to an embodiment of the present invention, FIG. 2 is a graph for explaining changes in the operation control and the operation state when the gas turbine is stopped, and FIG. 3 is a schematic of the gas turbine according to the present embodiment.

As shown in FIG. 3, the gas turbine according to the present embodiment includes a compressor 11, a combustor 12, a turbine 13, and an exhaust chamber 14. A generator (not shown) is connected to the turbine 13. The compressor 11 has an air inlet 15 through which air is taken in, and a compressor casing 16. In the compressor casing 16, a plurality of stator vanes 17 and rotor vanes 18 are arranged alternately. An extraction manifold 19 is provided on the outside of the compressor casing 16. The compressed air, which has been compressed by the compressor 11, is passed in the combustor 12, where fuel is mixed with the compressor 11 and the mixture is ignited by using a burner so that the compressed air is burned. The turbine 13 is configured so that a plurality of stator vanes 21 and rotor vanes 22 are arranged so as to alternate in a turbine casing 20. The exhaust chamber 14 includes an exhaust diffuser 23 that is connected to the turbine 13. A rotor (i.e. a turbine shaft) 24 is disposed so as to go through the central portion of each of the compressor 11, the combustor 12, the turbine 13, and the exhaust chamber 14. One end of the rotor 24 on the compressor 11 side is rotatably supported by a bearing 25, whereas the other end of the rotor 24 on the exhaust chamber 14 side is rotatably supported by an exhaust-side bearing 26. A plurality of disc plates are fixed onto the rotor 24, and also the rotor vanes 18 and 22 are connected to the rotor 24. In addition, a drive shaft for the generator (not shown) is connected to the end on the air inlet 15 side.

Air is taken into the gas turbine through the air inlet 15, and the air is compressed while it passes through the stator vanes 17 and the rotor vanes 18. The compressed air is at high temperature and high pressure. Fuel is mixed with the compressed air in the combustor 12 and the mixture is burned. As the mixture burns, combustion gas at high temperature and high pressure, which is an operation fluid, is generated in the in the combustor 12. As the combustion gas passes through the stator vanes 21 and the rotor vanes 22, the rotor 24 is driven with the force of the combustion gas. The rotor 24 drives the generator. The combustion gas, after driving the rotor 24, enters into the exhaust diffuser 23 included in the exhaust chamber 14. The exhaust diffuser 23 converts the combustion gas into an exhaust gas having a static pressure, and releases the exhaust gas into the atmosphere.

On the other hand, a part of the compressed air is extracted from the compressor 11 and it is supplied to a seal ring as seal air in the exhaust chamber 14. Thus, the lubricating oil is prevented from leaking out of the exhaust-side bearing 26, moreover, high-temperature gas is prevented from seeping into the exhaust-side bearing 26. However, when the operation of the gas turbine is stopped, it is not possible to extract the compressed air to be used as the seal air from the compressor 11. As a result, it is not possible to supply the seal air to the seal ring. Consequently, the ambient high-temperature gas enters the inside of the bearing, and the lubricating oil leaks from the bearing to the outside, and therefore, the exhaust-side bearing 26 gets heated. As a result, the lubricating oil supplied to the exhaust-side bearing 26 is carbonized and solidified. When the carbonized lubricating oil adheres to the sealing surface of the seal ring that is supposed to prevent the leakage of the lubricating oil, vibrations can occur because of the carbonized substance touching the rotor 24.

To solve this issue, the gas turbine according to the present embodiment includes a first air-supplying unit and a second air-supplying unit. The first air-supplying unit is operable to supply compressed air extracted from the compressor 11 to a seal air-supply passage, and the second air-supplying unit is operable to supply compressed air from an external supplementary air-source to the seal air-supply passage. In addition, a control apparatus (i.e. an air switching unit) switches between the first air-supplying unit and the second air-supplying unit, based on the operation state of the gas turbine. Next, the present embodiment will be explained more specifically.

As shown in FIG. 1, in the gas turbine according to the present embodiment, the rotor 24 is rotatably supported by a bearing box 32 via a journal bearing 31 that is included in the exhaust-side bearing 26. Lubricating oil is supplied to the journal bearing 31. Four seal rings, namely seal rings 33, 34, 35, and 36, are fixed onto an end portion of the bearing box 32 with predetermined intervals. Seal members 33*a*, 34*a*, 35*a*, and 36*a* are attached to the inner circumferential portions of the seal rings 33, 34, 35, and 36 so as to be positioned a small distance from the outer circumferential surface of the rotor 24. A seal air-supply bore 37 used for supplying seal air is provided along the radial direction of the seal ring 34 positioned at the center. A seal air-pipe 38 is connected to the basal end portion of the seal air-supply bore 37, whereas the tip end portion of the seal air-supply bore 37 opens to the sealing surface of the seal member 34*a*.

The seal air-pipe 38 has, in the middle portion thereof, a reducer 39. Tip end portions of a first air-supply pipe 41 (i.e. the first air-supplying unit) 41 and a second air-supply pipe (i.e. the second air-supplying unit) 42 are connected to the seal air-pipe 38 via a switching valve 40. The first air-supply pipe 41 has, in the middle portion thereof, a reducer 43. The basal end portion of the first air-supply pipe 41 is connected to the extraction manifold 19 provided with the-compressor 11, so that extracted air having pressure of a predetermined level can be supplied to the seal air-pipe 38. On the other hand, the second air-supply pipe 42 has, in the middle portion thereof, an open/close valve 44. The basal end portion of the second air-supply pipe 42 is connected to a supplementary air-source 45 provided in a structure in which the gas turbine is installed, so that air having pressure of a predetermined level can be supplied to the seal air-pipe 38. The control apparatus (i.e. the air switching unit) 46 is operable to control and switch the switching valve 44, based on the operation state of the gas turbine and is also operable to control and open and close the open/close valve 44.

When the gas turbine is in operation, the control apparatus 46 connects, with the switching valve 40, the first air-supply pipe 41 to the seal air-pipe 38 so as to allow communication therebetween. The control apparatus 46 also disconnects the second air-supply pipe 41 from the seal air-pipe 38 and closes the open/close valve 44. Thus, the compression air extracted from the extraction manifold 19 provided with the compressor 11 is introduced to the seal air-supply bore 37 through the first air-supply pipe 41 and the seal air-pipe 38. As a result, seal air is supplied to the seal member 34*a* in the seal ring 34. The supplied seal air passes by the sealing surface of the seal member 34*a* in the seal ring 34 and the outer circumferential surface of the rotor 24 and flows to the seal ring 33 side on the outside of the bearing box 32 and to the seal ring 35 side on the inside of the bearing box 32. As a result, because of the seal air that has flowed, from the seal ring 34 positioned at the center to the seal ring 33 side on the outside of the bearing box 32, it is possible to prevent the exhaust gas having a high temperature from seeping into the bearing box 32. Also, because of the seal air that has flowed from the seal ring 34 positioned at the center to the seal ring 35 side on the inside of the bearing box 32, it is possible to prevent the lubricating oil from leaking out of the journal bearing 31.

When the gas turbine is stopped, the control apparatus 46 connects, with the switching valve 40, the second air-supply pipe 42 to the seal air-pipe 38 and opens the open/close valve 44. The control apparatus 46 also disconnects the first air-supply pipe 41 from the seal air-pipe 38. Thus, the compression air from the supplementary air-source 45 is introduced to the seal air-supply bore 37 through the second air-supply pipe 42 and the seal air-pipe 38. As a result, seal air is supplied to the seal member 34*a* in the seal ring 34. The supplied seal air passes by the sealing surface of the seal member 34*a* in the seal ring 34 and the outer circumferential surface of the rotor 24 and flows to the seal ring 33 side on the outside of the bearing box 32 and to the seal ring 35 side on the inside of the bearing box 32. As a result, because of the seal air that has flowed from the seal ring 34 positioned at the center to the seal ring 33 side on the outside of the bearing box 32, it is possible to prevent the exhaust gas having a high temperature from seeping into the bearing box 32. Also, because of the seal air that has flowed from the seal ring 34 positioned at the center to the seal ring 35 side on the inside of the bearing box 32, it is possible to prevent the lubricating oil from leaking out of the journal bearing 31.

Next, the switching control for the seal air performed by the control apparatus 46 based on the operation state of the gas turbine will be explained more specifically.

As shown in FIG. 1 and FIG. 2, when the gas turbine is in operation and after fuel is supplied (i.e. the fuel supply is turned on), the control apparatus 46 turns on the switching valve 44 so that the seal air-pipe 38 is connected to the first air-supply pipe 41 so as to allow the communication therebetween and also closes (i.e. turns off) the open/close valve 44. Thus, the number of turbine rotations N is maintained so as to be a predetermined number, and also the gas turbine load (i.e. the pressure) F is maintained to be a predetermined load. In this situation, the compressed air extracted from the extraction manifold 19 provided with the compressor 11 is supplied, as seal air, to the seal ring 34 through the first air-supply pipe 41, the seal air-pipe 38, and the seal air-supply bore 37. Thus, it is possible to prevent the exhaust gas having a high temperature from seeping into the bearing box 32, and also to prevent the lubricating oil from leaking out of the journal bearing 31. Consequently, the lubricating oil is not heated by the exhaust gas having a high temperature, and also the temperature of the cavity T is maintained at a predetermined level.

At time t1 when the supply of the fuel is stopped (i.e. the fuel supply is turned off) to change the operation state so as to stop the gas turbine, the control apparatus 46 turns off the switching valve 40 so that the seal air-pipe 38 is connected to the second air-supply pipe 42 so as to allow the communication therebetween and also opens (i.e. turns on) the open/close valve 44. Accordingly, the number of turbine rotations N is lowered, and also the gas turbine load (i.e. the pressure) F is reduced. In this situation, the compressed air from the supplementary air-source 45 is supplied, as seal air, to the seal ring 34 through the second air-supply pipe 42, the seal air-pipe 38, and the seal air-supply bore 37. Thus, it is possible to prevent the exhaust gas having a high temperature from seeping into the bearing box 32 and also to prevent the lubricating oil from leaking out of the journal bearing 31. As a result, the lubricating oil is not heated by the exhaust gas having a high temperature, and the cavity temperature T is gradually lowered. On the contrary, in an example according to a conventional technique, when the compressed air from the supplementary air-source 45 is not supplied, as seal air, to the seal ring 34, it is not possible to prevent the exhaust gas having a high temperature from seeping into the inside of the bearing box 32. Also, it is not possible to prevent the lubricating oil from leaking out of the journal bearing 31. Thus, the lubricating oil gets heated by the exhaust gas having a high temperature, and the cavity temperature $T_0$ is raised.

At time t2 when a predetermined period of time tp (for example, 15 minutes) has elapsed since time t1 when the gas turbine was stopped, the control apparatus 46 closes (i.e. turns off) the open/close valve 44. Thus, the supply of the compressed air to the seal air-pipe 38 from the supplementary air-source 45 is stopped. In this situation, because the cavity temperature T is sufficiently lowered, the lubricating oil is no longer heated by the exhaust gas.

As described above, the control apparatus for a gas turbine according to the present embodiment has the seal air-supply bore 37, so as to supply the seal air that prevents the lubricating oil from leaking out of the exhaust-side bearing 26 rotatably supporting the rotor 24 and also prevents any high-temperature gas from entering the inside of the exhaust-side bearing 26. Also, the seal air-pipe 38 is connected to the seal air-supply bore 37. In addition, the control apparatus includes the first air-supply pipe 41 that is operable to supply compressed air extracted from the compressor 11 to the seal air-pipe 38 and the second air-supply pipe 42 that is operable to supply compressed air from the supplementary air-source 45 to the seal air-pipe 38. The control apparatus 46 is operable to switch between the first air-supply pipe 41 and the second air-supply pipe 42, based on the operation state of the gas turbine.

Accordingly, the compressed air is supplied to the seal air-supply bore 37 through one of the first air-supply pipe 41 and the second air-supply pipe 42, depending on the operation state of the gas turbine. Thus, it is possible to supply, without fail, seal air to the predetermined position when it is necessary. As a result, it is possible to prevent the lubricating oil from leaking out of the exhaust-side bearing 26 and also to prevent any high-temperature gas from entering the inside of the exhaust-side bearing 26. Consequently, it is possible to prevent the lubricating oil from getting hot due to the high-temperature gas. Because the lubricating oil in the exhaust-side bearing 26 does not get carbonized, it is possible to inhibit occurrence of-vibrations of the rotor 24 and to improve the reliability.

Further, the control apparatus 46 causes the compressed air to be supplied to the seal air-supply bore 37 through the first air-supply pipe 41 while the gas turbine is in normal operation, whereas the control apparatus 46 causes the compressed air to be supplied to the seal air-supply bore 37 through the second air-supply pipe 42 while the gas turbine is stopped. Accordingly, the compressed air extracted from the compressor 11 is supplied to the seal ring 34 while the gas turbine is in normal operation, whereas the compressed air from the supplementary air-source 45 is supplied to the seal ring 34 while the gas turbine is stopped. Thus, the seal air is supplied to the predetermined position without fail when it is necessary. Consequently, it is possible to prevent the lubricating oil from leaking out of the exhaust-side bearing 26. It is also possible to prevent any high-temperature gas from entering the inside of the exhaust-side bearing 26 and to properly prevent the lubricating oil from getting hot due to the high-temperature gas.

Furthermore, when the supply of fuel to the gas turbine is stopped, the control apparatus 46 actuates the switching valve 40 so that compressed air is supplied to the seal air-supply bore 37 through the second air-supply pipe 42. Accordingly, when the state of the gas turbine is changed from a normal state to a state in which the operation of the gas turbine is stopped by stopping the supply of the fuel, the supply source of the seal air is switched. Thus, it is possible to continuously supply compressed air, as the seal air, to the seal ring 34. As a result, it is possible to properly prevent the lubricating oil from getting hot due to the high-temperature gas.

In addition, when the compressed air has been supplied to the seal air-supply bore 37 through the second air-supply pipe 42 for a predetermined period of time after the gas turbine is stopped, the supply of the compressed air to the seal air-supply bore 37 is stopped. Thus, it is possible to prevent the seal air from being supplied wastefully, after the temperature of the exhaust-side bearing 26 stops.

It has been explained above that, when the supply of the fuel to the gas turbine is stopped, the supply source of the seal air is switched form the compressor 11 to the supplementary air-source 45. However, the present invention is not limited to this method. Another arrangement is acceptable in which when the gas turbine is stopped or when the gas turbine has been stopped for a predetermined period of time, if at least one of the cavity temperature, the operation load, and the number of turbine rotation becomes equal to or smaller than a predetermined value, the supply source of the seal air is switched from the compressor 11 to the supplementary air-source 45.

According to an aspect of the present invention, it is possible to supply, without fail, the seal air to the predetermined position from the seal air-supply passage when it is necessary. Accordingly, it is possible to prevent the lubricating oil from leaking out of the exhaust-side bearing. Also, it is possible to prevent any high-temperature gas from entering the inside of the exhaust-side bearing and to prevent the lubricating oil from getting hot due to the high-temperature gas. Consequently, the lubricating oil in the exhaust-side bearing does not get carbonized. As a result, it is possible to inhibit the occurrence of vibrations of the turbine shaft, and therefore to improve the reliability.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control apparatus for a gas turbine, the gas turbine including a compressor that compresses air to produce compressed air, a combustor that produces combustion gas from the compressed air, a turbine shaft that rotates due to the force of the combustion gas, and a bearing that rotatably supports a turbine shaft, the control apparatus comprising:
    a first passage configured to extract a portion of the compressed air from the compressor and supply extracted compressed air to the bearing;
    a second passage configured to supply compressed air from an external supplementary air-source to the bearing; and
    a passage switching unit that switches between the first passage and the second passage based on an operation state of the gas turbine.

2. The control apparatus according to claim 1, wherein the passage switching unit switches to the first passage while the gas turbine is in operation, and switches to the second passage while the gas turbine is not in operation.

3. The control apparatus according to claim 1, wherein the passage switching unit switches to the first passage while the gas turbine is in operation, and switches to the second passage while supply of fuel to the gas turbine is stopped.

4. The control apparatus according to claim 2, further comprising:
    a timer that counts time from a time point at which the passage switching unit switches to the second passage; and
    a stopping unit that stops supply of the compressed air from the external supplementary air-source to the second passage when the time counted by the timer is longer than a threshold.

5. The control apparatus according to claim 3, further comprising:
    a timer that counts time from a time point at which the passage switching unit switches to the second passage; and
    a stopping unit that stops supply of the compressed air from the external supplementary air-source to the second passage when the time counted by the timer is longer than a threshold.

6. The control apparatus according to claim 1, wherein the passage switching unit switches between the first passage and the second passage based on at least one of a cavity temperature, an operation load, and a number of turbine rotations of the gas turbine.

* * * * *